United States Patent
Comparan et al.

(10) Patent No.: US 9,053,037 B2
(45) Date of Patent: Jun. 9, 2015

(54) ALLOCATING CACHE FOR USE AS A DEDICATED LOCAL STORAGE

(75) Inventors: Miguel Comparan, Rochester, MN (US); Russell D. Hoover, Rochester, MN (US); Robert A. Shearer, Rochester, MN (US); Alfred T. Watson, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 13/079,520

(22) Filed: Apr. 4, 2011

(65) Prior Publication Data

US 2012/0254548 A1     Oct. 4, 2012

(51) Int. Cl.
  *G06F 12/00*   (2006.01)
  *G06F 12/08*   (2006.01)

(52) U.S. Cl.
  CPC ........ *G06F 12/0891* (2013.01); *G06F 12/0815* (2013.01); *G06F 12/0871* (2013.01)

(58) Field of Classification Search
  CPC ..... G06F 3/0628; G06F 3/0631; G06F 12/08; G06F 12/0802; G06F 12/0804; G06F 12/0844; G06F 12/0846; G06F 12/0815
  USPC ................................................. 711/135, 141
  See application file for complete search history.

(56) References Cited

U.S. PATENT DOCUMENTS

| | | | | |
|---|---|---|---|---|
| 6,055,610 A | * | 4/2000 | Smith et al. | 711/156 |
| 7,415,575 B1 | * | 8/2008 | Tong et al. | 711/133 |
| 7,681,020 B2 | * | 3/2010 | Kriegel et al. | 712/228 |
| 8,082,397 B1 | * | 12/2011 | Ezra et al. | 711/130 |
| 8,151,095 B1 | * | 4/2012 | Wilt | 712/228 |
| 2006/0026390 A1 | * | 2/2006 | Cabillic et al. | 712/200 |
| 2006/0161760 A1 | * | 7/2006 | Jordan et al. | 711/205 |
| 2007/0079037 A1 | | 4/2007 | Scoredos | |
| 2008/0028181 A1 | * | 1/2008 | Tong et al. | 711/207 |
| 2010/0332716 A1 | * | 12/2010 | Sheaffer et al. | 711/3 |

OTHER PUBLICATIONS

U.S. Appl. No. 13/684,553, entitled Allocating Cache for Use as a Dedicated Local Storage, filed Nov. 25, 2012.

* cited by examiner

*Primary Examiner* — Aimee Li
*Assistant Examiner* — Prasith Thammavong
(74) *Attorney, Agent, or Firm* — Patterson & Sheridan, LLP (57) ABSTRACT

A method and apparatus dynamically allocates and deallocates a portion of a cache for use as a dedicated local storage. Cache lines may be dynamically allocated and deallocated for inclusion in the dedicated local storage. Cache entries that are included in the dedicated local storage may not be evicted or invalidated. Additionally, coherence is not maintained between the cache entries that are included in the dedicated local storage and the backing memory. A load instruction may be configured to allocate, e.g., lock, a portion of the data cache for inclusion in the dedicated local storage and load data into the dedicated local storage. A load instruction may be configured to read data from the dedicated local storage and to deallocate, e.g., unlock, a portion of the data cache that was included in the dedicated local storage.

13 Claims, 8 Drawing Sheets

ALLOCATING CACHE FOR USE AS A DEDICATED LOCAL STORAGE

BACKGROUND

The field of the invention generally relates to caching data and, more specifically to allocating cache for use as a dedicated local storage.

Conventional data caches are configured to store data that is frequently accessed by a processor to reduce the latency needed to read and write the data to a backing memory. Data caches also reduce the bandwidth consumed between the processor and backing memory since data is only read from the backing memory and stored in the cache when a cache miss occurs. Similarly, writes to the backing memory may be reduced when the data cache is used since data is copied from the cache to the backing memory when the data is evicted from the data cache.

In order to allow a data cache to also serve as a dedicated local storage, one conventional data cache may be configured in a mode that converts half of the data cache storage for use as a fixed size dedicated local storage. The half of the data cache includes only contiguous cache lines. Furthermore, the contiguous cache lines of the dedicated local storage are accessed using addresses that are outside of the address range of the backing memory. The size of the dedicated local storage is fixed and the cache lines that are configured to form the dedicated local storage are also fixed.

SUMMARY

The present invention generally includes a system, article of manufacture and method for dynamically allocating a portion of a cache for use as a dedicated local storage. Cache lines may be dynamically allocated (and deallocated) for inclusion in (and exclusion from) the dedicated local storage. Cache entries that are included in the dedicated local storage may not be evicted or invalidated. Additionally, coherence is not maintained between the cache entries that are included in the dedicated local storage and the backing memory. A load instruction may be configured to allocate, e.g., lock, a portion of the data cache for inclusion in the dedicated local storage and load data into the dedicated local storage. A load instruction may be configured to read data from the dedicated local storage and to deallocate, e.g., unlock, a portion of the data cache that was included in the dedicated local storage. A push context instruction may be used to allocate a portion of the data cache as a dedicated local storage for a thread and store the current context for a thread. A pop context instruction may be used to load the current context for the thread and deallocate the portion of the data cache as the dedicated local storage for the thread.

According to one embodiment of the invention, a method, system and article of manufacture dynamically allocates a portion of a cache for use as a dedicated local storage. A first instruction defining the portion of the cache is received and existing data stored in the portion of the cache is evicted. A setting indicating that entries in the portion of the cache should not be evicted or invalidated and that coherency should not be maintained between entries in the portion of the cache and a backing memory is updated.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention generally includes a system, article of manufacture and method for dynamically allocating a portion of a cache for use as a dedicated local storage. Cache lines may be dynamically allocated (and deallocated) for inclusion in (and exclusion from) the dedicated local storage. Cache entries that are included in the dedicated local storage may not be evicted or invalidated. Additionally, coherence is not maintained between the cache entries that are included in the dedicated local storage and the backing memory. A load instruction may be configured to allocate, e.g., lock, a portion of the data cache for inclusion in the dedicated local storage and load data into the dedicated local storage. A load instruction may be configured to read data from the dedicated local storage and to deallocate, e.g., unlock, a portion of the data cache that was included in the dedicated local storage. A push context instruction may be used to allocate a portion of the data cache as a dedicated local storage for a thread and store the current context for a thread. A pop context instruction may be used to load the current context for the thread and deallocate the portion of the data cache as the dedicated local storage for the thread.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, an application may execute on a computing system in the cloud and dynamically allocate and deallocate portions of a data cache for use as dedicated local storage.

Figure 1:
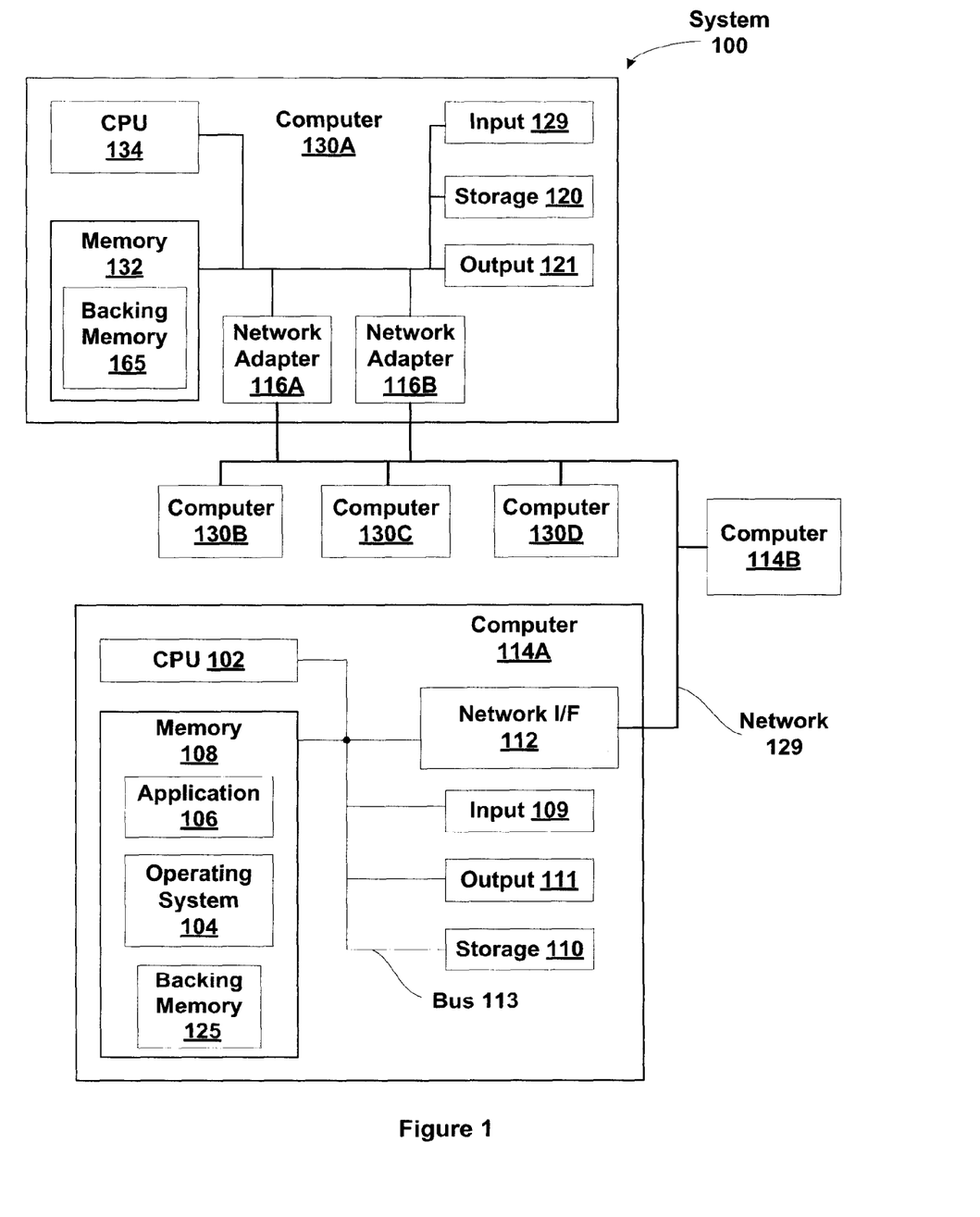
FIG. 1 depicts a block diagram of a system in which embodiments of the present invention may be implemented.

Referring now to FIG. 1 that depicts a block diagram of a system 100 in which embodiments of the present invention may be implemented. In general, the networked system 100 includes a client (e.g., user's) computer (two such client computers 114A-B are shown; also separately (and collectively)

referred to as computer(s) 114) and at least one server computer (four such computers 130A-D are shown; also separately (and collectively) referred to as computer(s) 130. Computers generally are single devices with resources for computer processing, including processors, memory and storage.

Computer 114A and computer 130A are representative of one particular embodiment of a client and server, respectively. The computer 114A and computer 130A are connected via a network 129. In general, the network 129 may be a local area network (LAN) and/or a wide area network (WAN). In a particular embodiment, the network 129 is the Internet. Computers 130 may be network servers, web servers, or any other computer that uses a network adapter (NA) 116, e.g., NA 116A-B to communicate with computers 114 and other computers 130 over network 129.

The computer 114A includes a Central Processing Unit (CPU) 102 connected via a bus 113 to a memory 108, storage 110, an input device 109, an output device 111, and a network interface device 112. The input device 109 can be any device to give input to the computer 114A. For example, a keyboard, keypad, light pen, touch-screen, track-ball, or speech recognition unit, audio/video player, and the like could be used. The output device 111 can be any device to give output to the user, e.g., any conventional display screen or set of speakers, along with their respective interface cards, i.e., video cards and sound cards (not shown). Although shown separately from the input device 109, the output device 111 and input device 109 could be combined. For example, a display screen with an integrated touch-screen, a display with an integrated keyboard, or a speech recognition unit combined with a text speech converter could be used.

The network interface device 112 may be any entry/exit device configured to allow network communications between the computer 114A and the computers 130 via the network 129. For example, the network interface device 112 may be a network adapter or other network interface card (NIC).

Storage 110 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 108 and storage 110 could be part of one virtual address space spanning multiple primary and secondary storage devices.

The computer 114A is generally under the control of an operating system 104, which is shown in the memory 108. Illustrative operating systems, which may be used to advantage, include Linux® and Microsoft Windows®. Linux is a trademark of Linus Torvalds in the US, other countries, or both.

The memory 108 is preferably a random access memory sufficiently large to hold the necessary programming and data structures of client applications. While the memory 108 is shown as a single entity, it should be understood that the memory 108 may in fact comprise a plurality of modules, and that the memory 108 may exist at multiple levels, from high speed registers and caches to lower speed but larger DRAM chips.

Illustratively, the memory 108 includes an application 106 that, when executed on CPU 102, provides support for exchanging information between the various servers 130 and locating network addresses at one or more of the servers 130. In one embodiment, the application 106 is a browser that includes a web-based Graphical User Interface (GUI), which allows the user to navigate and display web-pages located on the Internet. However, more generally the application may be a thin client application configured to transfer data (e.g., HTML, XML, etc.) between the computer 114A and the computers 130 via, for example, HTTP.

The CPU 102 may be configured to execute multiple threads and may include a data cache. One or more portions of the data cache may be dynamically allocated and deallocated for use as a dedicated local storage. Portions of the data cache may be dynamically allocated and deallocated as needed to store state information for a particular context of a thread. The memory 108 is configured to include a backing memory 125 for the data cache. Data is copied from the backing memory 125 into the data cache and maintained in the data cache until the data is evicted and copied back to the backing memory 125. Importantly, the dedicated local storage is not necessarily coherent with the backing memory 125. Entries in the data cache that are included as part of the dedicated local storage may not be evicted or invalidated.

Like computer 114A, computer 130A may also include a memory 132, an input device 129, an output device 121, and a storage 210, that are similar to memory 108, input device 109, output device 111, and storage 110, respectively. The CPU 134 may also be configured to execute multiple threads and may include a data cache. One or more portions of the data cache may be dynamically allocated and deallocated for use as a dedicated local storage and the memory 132 is configured to include a backing memory 165 for the data cache that performs a function similar to the backing memory 125 relative to a data cache in the CPU 102.

Figure 2:
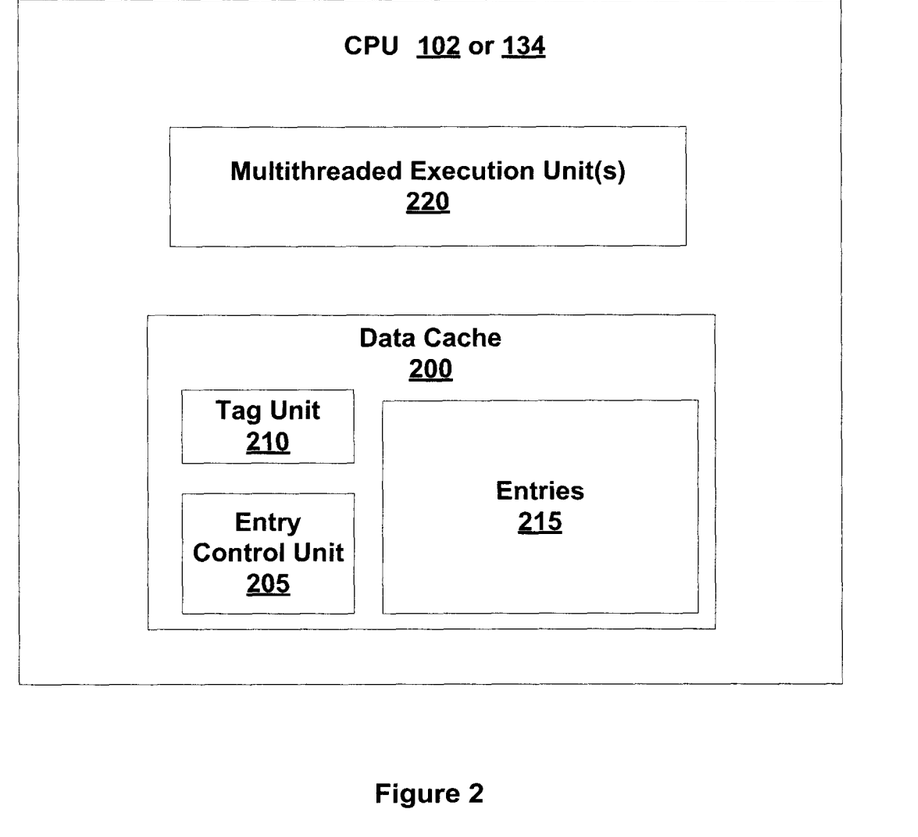
FIG. 2 depicts a block diagram of a cache in the CPU shown in FIG. 1, according to an embodiment of the present invention.

FIG. 2 depicts a block diagram of a data cache 200 in the CPU 102 or 134 shown in FIG. 1, according to an embodiment of the present invention. The CPU 102 or 134 includes multithreaded execution unit(s) 220 that access the data cache 200 for load and store operations. The data cache 200 includes a tag unit 210, entry control unit 205, and entries 215. Data is stored in the entries 215, where a cache line may include one or more entries and has a respective address. The tag unit 210 translates the addresses received from the multithreaded execution unit(s) 220 into cache lines and determines whether a request is a hit or miss. The entries 215 may be organized in one or more "ways", where a way is the number of different banks in which data may be stored. In other words, when the cache is modeled as storage organized in multiple columns, each containing multiple rows (cache lines), a way is a column. An 8-way cache provides 8 different locations in which data for a particular address may be stored.

Typically, caches allow for a way to be locked so that data stored in the locked way cannot be evicted or invalidated. The entry control unit 205 maintains a lock bit for each way to indicate whether or not the way is locked. In addition to allowing the locking of a way, data cache 200 also allows for locking of individual cache lines or a block defined by a range of addresses. The entry control unit 205 is configured to perform locking and unlocking of portions of the entries 215 by maintaining a lock bit for each cache line in entries 215. The entry control unit 205 is also configured to maintain a valid bit for each cache line in entries 215 and to perform invalidation, validation, eviction, and maintain coherency between entries 215 and the backing memory 165 or 125.

When a cache line is locked the entry control unit 205 sets the valid bit and the lock bit in order to ensure that the data stored in the entry is not evicted. When a locked entry is unlocked, the entry control unit 205 clears the lock bit and the unlocked entry is then available for eviction. When the locked entry is unlocked and evicted, the entry control unit 20 copies the data from the cache line to the backing memory 165 or 125 and clears the valid bit and the locked bit. The entry control unit 206 may also be configured to maintain a super-lock bit for each cache line in entries 215. The super-lock bit is set to indicate that an entry should not be evicted or invalidated and also that the coherence should not be maintained between the entry and the backing memory 165 or 125. In particular, when the entry is unlocked and evicted, the entry control unit clears the super-lock bit and the valid bit, but does not copy the data from the cache line to the backing memory 165 or 125.

Because the super-lock function is used to allocate a portion of the data cache 200 for dedicated local storage, coherence is not maintained between the entries within the portion of the data cache 200 and the backing memory 165 or 125. In some cases the data stored in the portion of the data cache 200 is not also stored in the backing memory 165 or 125. Instead, the data is generated by the multithreaded execution unit(s) 220, stored in the portion of the data cache 200 and loaded from the portion of the data cache 200. The super-lock features allows portions of the data cache 200 to be quickly and dynamically allocated for use as dedicated local storage without consuming bandwidth between the CPU 102 or 134 and the memory 108 or 132, respectively.

In one embodiment, a separate super-lock bit is not maintained by the entry control unit 205. Instead, the super-lock function is encoded using the lock and valid bits. When a cache line is super-locked the lock bit is set and the valid bit is cleared. When a cache line is unsuper-locked the lock bit is cleared and the valid bit remains cleared. The data is not copied to the backing memory 165 or 125 since coherency is not maintained between super-locked entries and the backing memory 165 or 125.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Reference will be made to elements introduced above and described with respect to FIGS. 1 and 2.

Figure 3A:
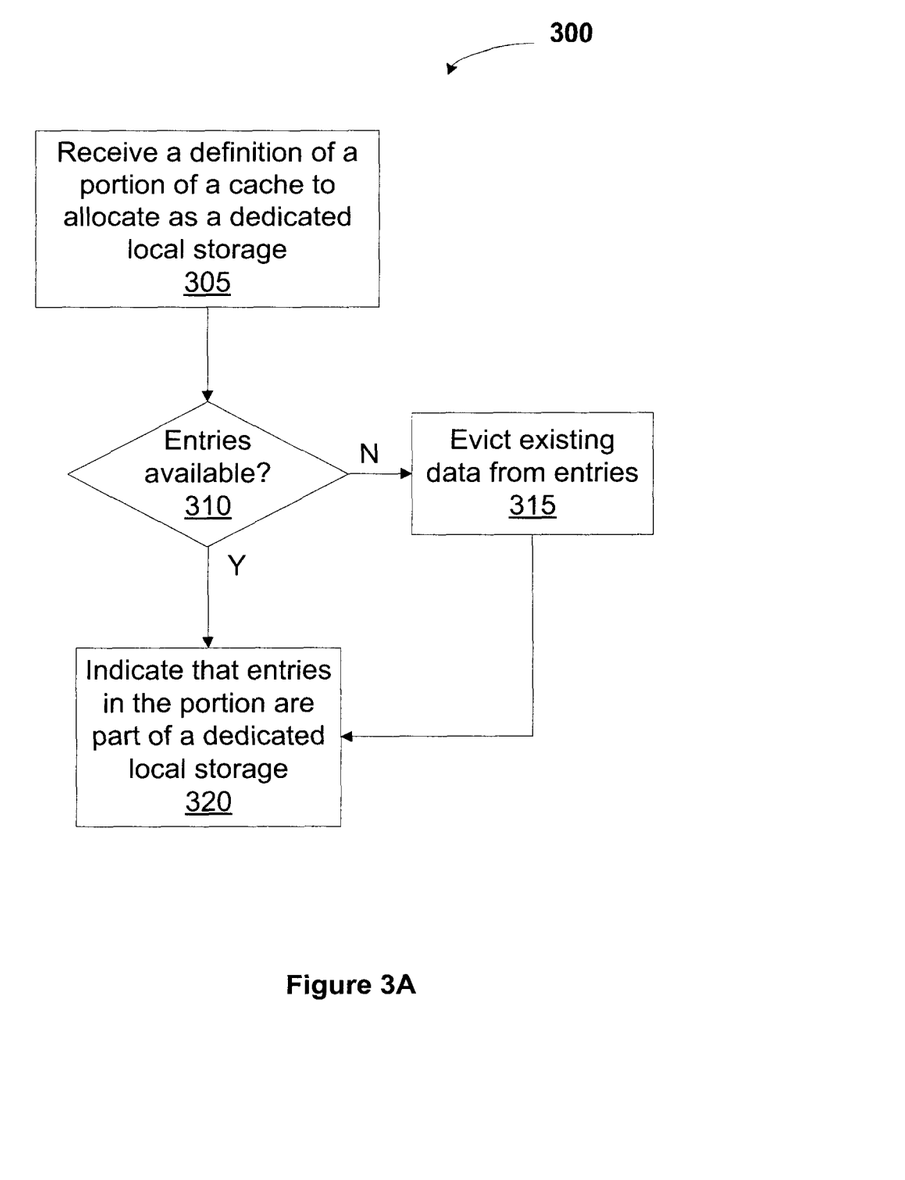
FIG. 3A is a flowchart illustrating a method for allocating a portion of the cache for dedicated storage, according to an embodiment of the present invention.

FIG. 3A is a flowchart 300 illustrating a method for allocating a portion of the data cache 200 for dedicated storage, according to an embodiment of the present invention. At step 305, a definition of a portion of the data cache 200 to allocate as a dedicated local storage is received. The definition may specify one or more cache lines, ways, or a block corresponding to a range of addresses as the portion of the data cache 200 to allocate. At step 310, the entry control unit 205 determines if entries are available in entries 215 to allocate to the dedicated local storage. If, at step 310, the entry control unit 205 determines that entries are available for allocation, then the entry control unit 205 proceeds directly to step 320. At step 320, the entry control unit 205 indicates that entries in the portion of the data cache 200 that are allocated for use as the dedicated local storage are super-locked by updating a setting associated with the portion of the entries 215 in the data cache 200. The updating may set the super-lock bit(s) for the portion of the entries 215 or the updating may set the lock bit(s) and clear the valid bit(s) for the portion of the entries 215. Note that one or more additional portions of the data cache 200 may be allocated to generate different dedicated local storages within the data cache 200.

If, at step 310, the entry control unit 205 determines that entries are not available for allocation, then at step 315 the entry control unit 205 evicts existing data from a portion of entries 215. The entry control unit 205 copies the existing data to the backing memory 125 or 165 and clears the invalid bit(s) for the portion of the entries 215 before proceeding to step 320.

Figure 3B:
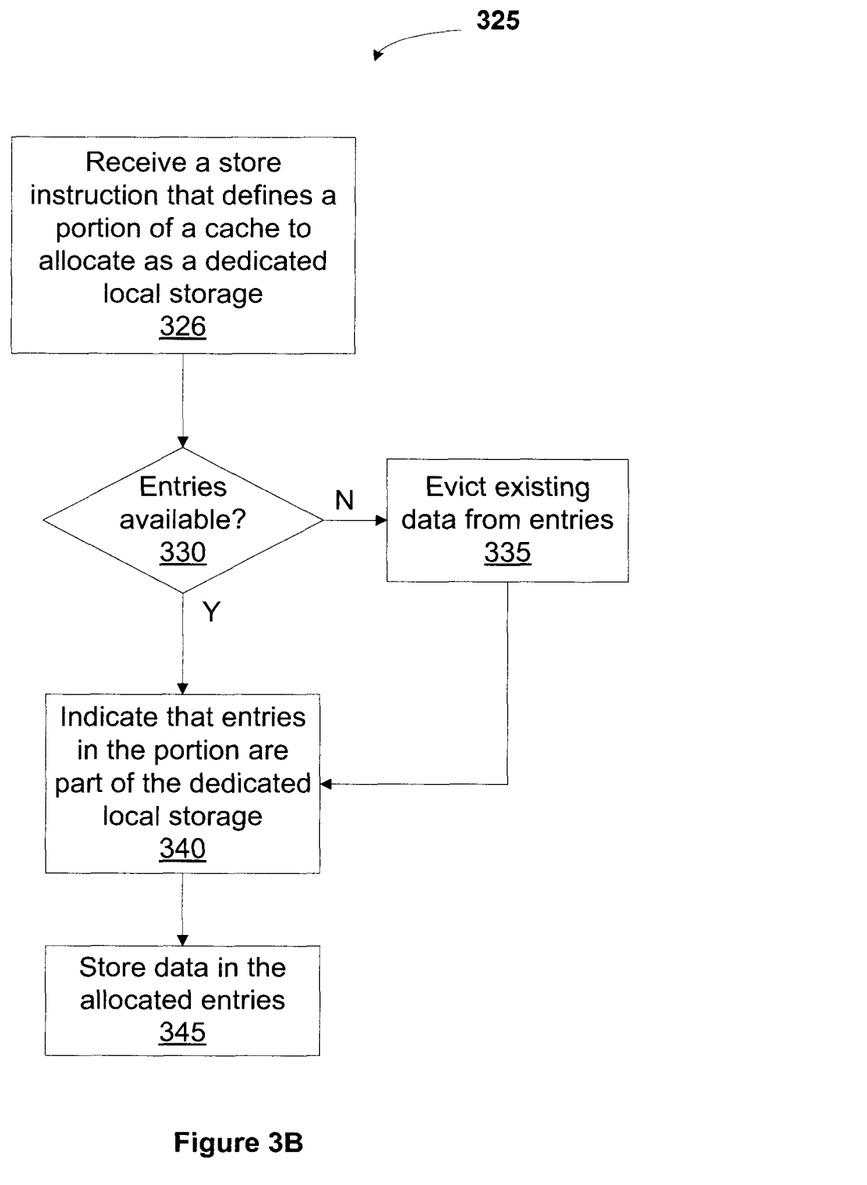
FIG. 3B is a flowchart illustrating a method for allocating a portion of the cache for dedicated storage using an instruction, according to an embodiment of the present invention.

FIG. 3B is a flowchart 325 illustrating a method for allocating a portion of the data cache 200 for dedicated storage using an instruction, according to an embodiment of the present invention. At step 326, a store instruction that defines the portion of the data cache 200 to allocate as a dedicated local storage is received. The instruction includes data or a pointer to data to be stored in the portion of the data cache 200 and may specify one or more cache lines, ways, or a block corresponding to a range of addresses to define the portion of the data cache 200. Steps 330, 340, and 335 are performed in the same manner as steps 310, 320, and 315 of FIG. 3A. At step 345, the entry control unit 205 stores the data specified by the store instruction in the portion of the data cache 200 that is allocated for use as the dedicated local storage.

Figure 3C:
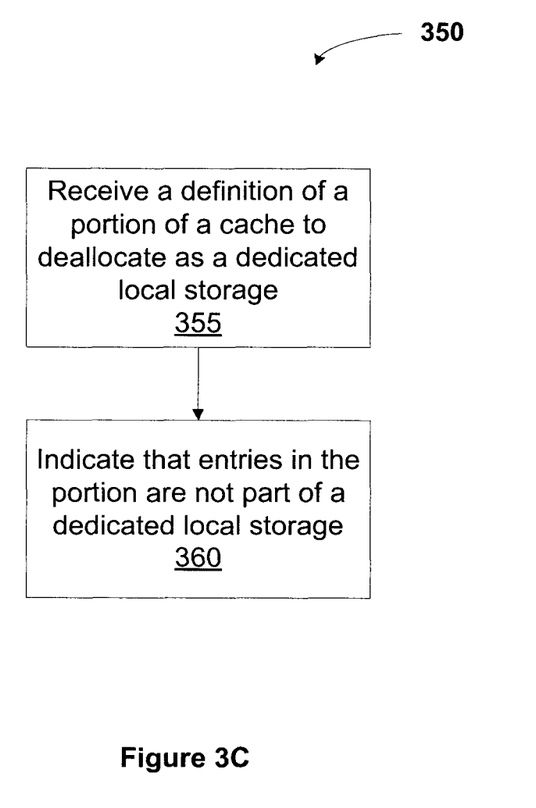
FIG. 3C is a flowchart illustrating a method for deallocating a portion of the cache for dedicated storage, according to an embodiment of the present invention.

FIG. 3C is a flowchart 350 illustrating a method for deallocating a portion of the data cache 200 for dedicated storage, according to an embodiment of the present invention. At step 355, a definition of a portion of the data cache 200 to deallocate as a dedicated local storage is received. The definition may specify one of more cache lines, ways, or a block corresponding to a range of addresses as the portion of the data cache 200 to deallocate. At step 360, the entry control unit 205 indicates that entries in the portion of the data cache 200 that are deallocated for use as the dedicated local storage are unsuper-locked by updating the setting associated with the portion of the entries 215 in the data cache 200. The updating may clear the super-lock bit(s) for the portion of the entries 215 or the updating may clear the lock bit(s) (the valid bit(s) would already be cleared) for the portion of the entries 215. Note that it is possible to deallocate only a sub-portion of the entries 215 within a portion of entries in the data cache 200 that were allocated as a particular dedicated local storage. In other words, all of the entries within an allocated portion of the data cache 200 do not need to be deallocated at the same time.

Figure 3D:
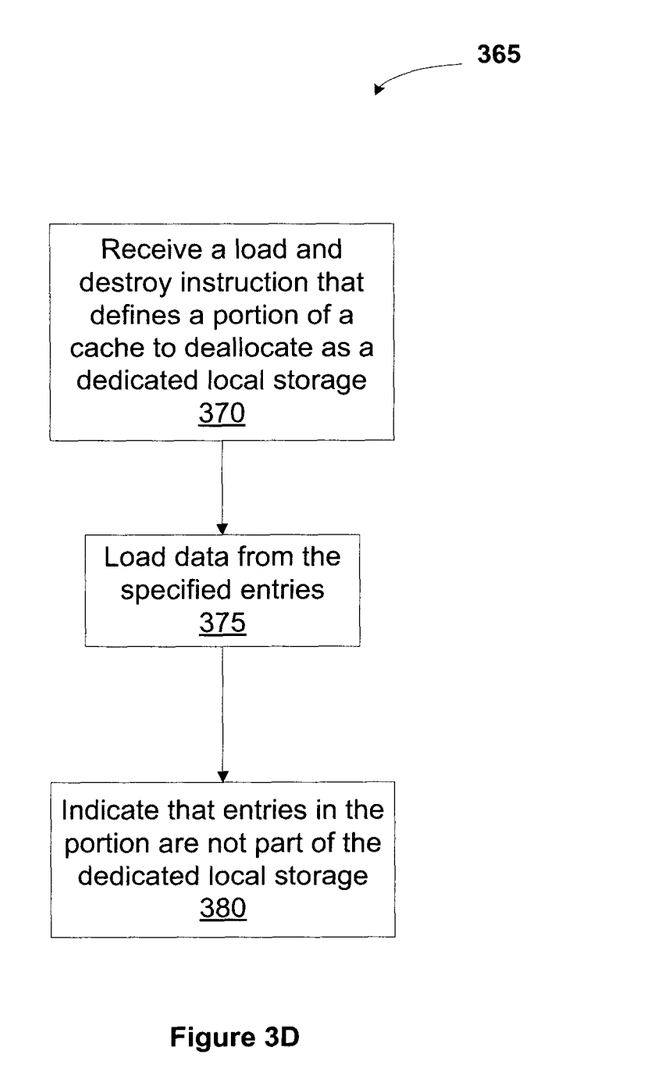
FIG. 3D is a flowchart illustrating a method for deallocating a portion of the cache for dedicated storage using an instruction, according to an embodiment of the present invention.

FIG. 3D is a flowchart 365 illustrating a method for deallocating a portion of the data cache 200 for dedicated storage using an instruction, according to an embodiment of the present invention. At step 370, a load and destroy instruction that defines a portion of the data cache 200 to read and deallocate as a dedicated local storage is received. The instruction may specify one or more cache lines, ways, or a block corresponding to a range of addresses to define the portion of the data cache 200. At step 375, the entry control unit 205 reads the data specified by the load and destroy instruction from entries specified by the load and destroy instruction that are in the portion of the data cache 200 allocated for use as the dedicated local storage. Step 380 is performed in the same manner as step 360 of FIG. 3C.

When one or more of the multithreaded execution unit(s) 220 performs a context switch, the current context is stored and a new context is loaded into the execution unit. After processing of the new context is completed, the stored context is loaded into the execution unit to continue being processed. A push context instruction may be used to allocate a portion of the data cache as a dedicated local storage for a thread and store the current context for a thread. A pop context instruction may be used to load the stored (current) context for the thread and deallocate the portion of the data cache as the dedicated local storage for the thread. In a conventional system, a dedicated stack storage may be used to push and pop thread context data. Alternatively, the thread context data may be stored to memory 108 or 132, introducing additional latency and requiring consumption of bandwidth between the CPU 102 or 134 and memory 108 and 132, respectively.

Figure 4A:
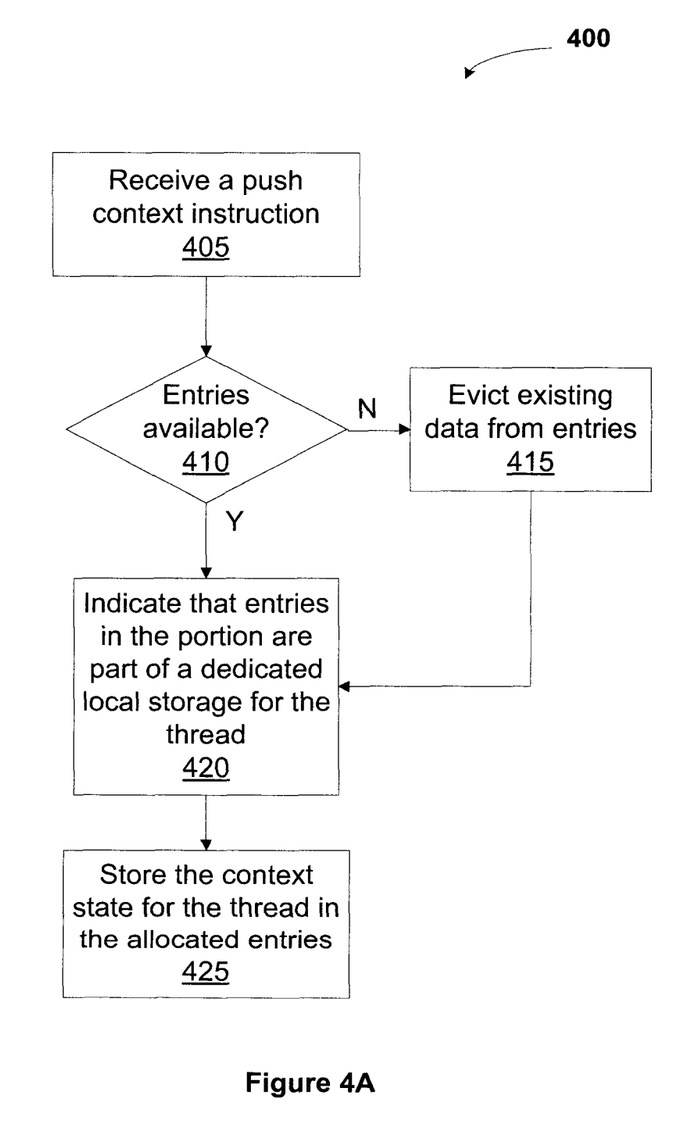
FIG. 4A is a flowchart illustrating a method for allocating a portion of the cache for performing a context switch, according to an embodiment of the invention.

FIG. 4A is a flowchart 400 illustrating a method for allocating a portion of the data cache 200 for performing a context switch, according to an embodiment of the invention. At step 405, a push context instruction is received by the data cache 200. The push context instruction may define the portion of the data cache 200 to allocate for use as a dedicated local storage for storing thread context state or the entry control unit 205 may determine the number of cache entries needed to store the thread context state based on information provided with the push context instruction. The instruction may include or indicate the location of the current thread context data to be stored in the portion of the data cache 200. Steps 410, 420, and 415 are performed in the same manner as steps 310, 320, and 315 of FIG. 3A. At step 425, the entry control unit 205 stores the data specified by the push context instruction in the portion of the data cache 200 that is allocated (superlocked) for use as the dedicated local storage for the thread context state.

Figure 4B:
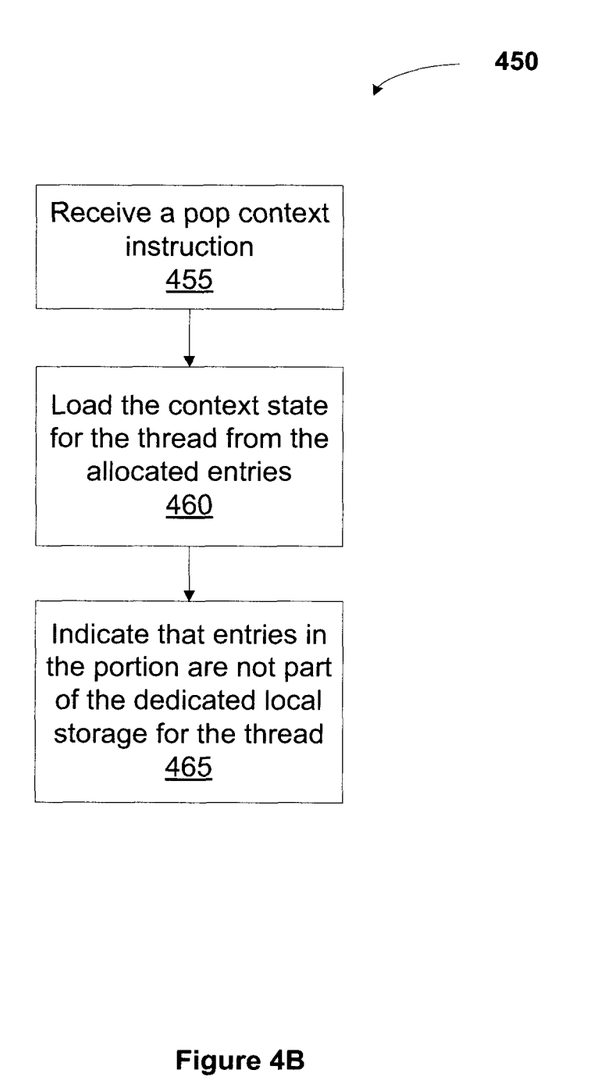
FIG. 4B is a flowchart illustrating a method for deallocating a portion of the cache for performing a context switch, according to an embodiment of the invention.

FIG. 4B is a flowchart 450 illustrating a method for deallocating a portion of the data cache 200 for performing a context switch, according to an embodiment of the invention. At step 455, a pop context instruction is received by the data cache 200. The pop context instruction may define the portion of the data cache 200 to deallocate for use as a dedicated local storage for storing the thread context state or the entry control unit 205 may determine the portion of the data cache 200 to deallocate based on information provided with the pop context instruction. At step 460, the entry control unit 205 reads the pushed thread context state specified by the pop context instruction from entries that are in the portion of the data cache 200 allocated for use as the dedicated local storage for storing the thread context state. At step 465, the entry control unit 205 indicates that entries in the portion of the data cache 200 that are deallocated for use as the dedicated local storage to store the thread context state are deallocated (unsuperlocked) by updating the setting associated with the portion of the entries 215 in the data cache 200.

The present invention generally includes a system, article of manufacture and method for dynamically allocating a portion of a cache for use as a dedicated local storage. Individual cache lines may be dynamically allocated and deallocated for inclusion in the dedicated local storage. Alternatively, cache ways or a block specifying an address range may be dynamically allocated and deallocated to define the dedicated local storage. Cache entries that are included in the dedicated local storage may not be evicted or invalidated. Coherence is not maintained between the cache entries included in the dedicated local storage and the backing memory. A store instruction may be configured to allocate, e.g., lock, a portion of the data cache for inclusion in the dedicated local storage and store data into the dedicated local storage. A load and destroy instruction may be configured to read data from the dedicated local storage and to deallocate, e.g., unsuper-lock, a portion of the data cache that was included in the dedicated local storage. A push context instruction may be used to allocate a portion of the data cache as a dedicated local storage for a thread and store the current context for a thread. A pop context instruction may be used to load the current context for the thread and deallocate the portion of the data cache as the dedicated local storage for the thread. The super-lock features allows portions of the data cache to be quickly and dynamically allocated for use as dedicated local storage without consuming bandwidth between the CPU and the backing memory.

While the foregoing is directed to embodiments of the present invention, other and further embodiments of the invention may be devised without departing from the basic scope thereof, and the scope thereof is determined by the claims that follow.

What is claimed is:

1. A system for dynamically allocating a portion of a cache for use as dedicated local storage in a multithreading processing environment, the system comprising:
 a backing memory; and
 a multithreaded processor coupled to the backing memory and that includes the cache,
 wherein the cache is configured to:
  receive a push context instruction that includes information associated with context data for a first thread being currently executed by the processor;
  using the information included with the push context instruction, define a portion of the cache to be allocated for use as dedicated local storage;
  store the context data for the first thread in the defined portion of the cache; and
  update a setting to indicate that entries in the defined portion of the cache should not be evicted or invalidated and that coherency should not be maintained between entries in the portion of the cache and the backing memory.

2. The system of claim 1, wherein the cache is further configured to:
 upon completion of processing a second thread, receive a pop context instruction that includes information associated with the stored context data; and
 using the information included with the pop context instruction, read the stored context data.

3. The system of claim 2, wherein the processor resumes execution of the first thread after the stored context data is read.

4. The system of claim 2, wherein the cache is further configured to:
 using the information included with the pop context instruction, define a second portion of the cache to be deallocated from use as dedicated local storage.

5. The system of claim 4, wherein the cache is further configured to: update the setting to indicate that entries in the second portion may be evicted or invalidated, and that coherency should be maintained between entries in the second portion and the backing memory.

6. The system of claim 4, wherein the portion and the second portion differ in size.

7. The system of claim 1, wherein the information included with the push context instruction includes one of the context data and an address for the context data.

8. The system of claim 1, wherein the information included with the push context instruction explicitly defines the portion of the cache to be allocated.

9. The system of claim 1, wherein defining the portion of the cache to be allocated includes determining a number of cache entries needed to store the context data.

10. The system of claim 9, wherein defining the portion of the cache to be allocated further includes evicting existing data from one or more cache entries when an insufficient number of cache entries are available for allocation.

11. The system of claim 1, wherein the setting includes a super-lock bit that indicates both whether a corresponding entry may be evicted or invalidated, and whether coherence should be maintained between the entry and the backing memory.

12. The system of claim 11, wherein the super-lock bit is not maintained separately, but is encoded using a lock bit and a valid bit for the corresponding entry.

13. The system of claim 11, wherein the setting includes a respective super-lock bit for each cache line in the entries in the defined portion of the cache.

\* \* \* \* \*